US011195526B2

(12) United States Patent
Hirabayashi et al.

(10) Patent No.: US 11,195,526 B2
(45) Date of Patent: Dec. 7, 2021

(54) INDICATION MANAGEMENT DEVICE AND CONTROL METHOD THEREFOR

(71) Applicant: TOSHIBA TEC KABUSHIKI KAISHA, Tokyo (JP)

(72) Inventors: Kazunori Hirabayashi, Yokohama Kanagawa (JP); Kazuhiro Ogura, Hiratsuka Kanagawa (JP); Ryuichi Aoyama, Mishima Shizuoka (JP); Koji Nagai, Ota Tokyo (JP); Toshinori Fukuta, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 16/524,469

(22) Filed: Jul. 29, 2019

(65) Prior Publication Data
US 2020/0143803 A1 May 7, 2020

(30) Foreign Application Priority Data

Nov. 1, 2018 (JP) .............................. JP2018-206577

(51) Int. Cl.
*G10L 15/22* (2006.01)
*H04N 1/00* (2006.01)

(52) U.S. Cl.
CPC ......... *G10L 15/22* (2013.01); *H04N 1/00403* (2013.01); *G10L 2015/223* (2013.01)

(58) Field of Classification Search
USPC .................................................... 704/1–504
See application file for complete search history.

(56) References Cited

U.S. PATENT DOCUMENTS 6,044,363 A * 3/2000 Mori .................. G06Q 30/0601
705/26.3
7,051,212 B2 * 5/2006 Ginter .................. H04L 9/0819
713/193
7,443,295 B2 * 10/2008 Brice .................... B62B 3/1424
235/385

(Continued)

FOREIGN PATENT DOCUMENTS

JP 2017-083997 5/2017

OTHER PUBLICATIONS

Extended European Search Report for European Patent Application No. 19194347.1 dated Nov. 14, 2019.

*Primary Examiner* — Marcus T Riley
(74) *Attorney, Agent, or Firm* — Amin, Turocy & Watson, LLP

(57) ABSTRACT

According to one embodiment, an indication management device includes voice acquisition means, indication recognition means, importance degree determination means, and output control means. The voice acquisition means acquires a voice which is input by a voice input terminal. The indication recognition means recognizes details of an indication from the voice acquired by the voice acquisition means. The importance degree determination means determines a degree of importance of the indication from the voice acquired by the voice acquisition means. The output control means controls output of indication details to an output device in accordance with the degree of importance determined by the importance degree determination means.

17 Claims, 9 Drawing Sheets

(56) References Cited

U.S. PATENT DOCUMENTS

| | | | | |
|---|---|---|---|---|
| 8,886,545 B2* | 11/2014 | Meisel | .................... | G06F 3/167 |
| | | | | 704/275 |
| 2003/0007178 A1* | 1/2003 | Jeyachandran | ........ | G06K 15/00 |
| | | | | 358/1.15 |
| 2005/0114882 A1* | 5/2005 | Sakamaki | .......... | H04N 1/00331 |
| | | | | 725/29 |
| 2007/0280118 A1* | 12/2007 | Takahashi | ............ | G06Q 10/087 |
| | | | | 370/241 |
| 2008/0154611 A1* | 6/2008 | Evermann | ........... | H04M 7/0036 |
| | | | | 704/275 |
| 2010/0185448 A1* | 7/2010 | Meisel | .................... | G10L 17/22 |
| | | | | 704/256.1 |
| 2011/0087535 A1* | 4/2011 | Yoshizawa | ............. | G06Q 20/20 |
| | | | | 705/14.26 |
| 2015/0279387 A1* | 10/2015 | List | ........................ | H04R 1/323 |
| | | | | 704/226 |
| 2016/0210602 A1* | 7/2016 | Siddique | ............... | G06Q 20/384 |
| 2017/0323641 A1* | 11/2017 | Shimizu | .................. | B60R 16/02 |
| 2020/0143803 A1* | 5/2020 | Hirabayashi | ........... | G06Q 10/10 |

* cited by examiner

INDICATION MANAGEMENT DEVICE AND CONTROL METHOD THEREFOR

CROSS-REFERENCE TO RELATED APPLICATION

This application is based upon and claims the benefit of priority from Japanese Patent Application No. 2018-206577, filed Nov. 1, 2018, the entire contents of which are incorporated herein by reference.

FIELD

Embodiments described herein relate generally to an indication management device and a control method of causing a computer to function as the indication management device.

BACKGROUND

A technique is already known in which an indicator indicating an operation and an operator executing the indicated operation respectively have terminals, and an indication input through a voice from the indicator's terminal is output to the operator's terminal through a voice or display. This technique allows an indication to be given easily because a voice input is used, and is effective when an indicator gives an indication to a specific operator. However, this technique is not effective when an operator gives an indication to an unspecified operator who may be any person as long as the person is a member in a group to which the operator belongs. In a case of an indication to be given to an unspecified operator, the indication from an indicator may be output to a common output device. For example, it is conceivable that an indicator displays text indicating details of an indication, which is input through a voice, on a display device installed at a common location.

However, there is a concern that an operator may miss an important indication having urgency by simply outputting an indication from an indicator to a common output device.

DETAILED DESCRIPTION

Embodiments provide an indication management device capable of accurately giving an indication to an unspecified operator while using a voice input from an indicator.

In general, according to one embodiment, an indication management device includes voice acquisition means, indication recognition means, importance degree determination means, and output control means. The voice acquisition means acquires a voice which is input by a voice input terminal. The indication recognition means recognizes details of an indication from the voice acquired by the voice acquisition means. The importance degree determination means determines a degree of importance of the indication from the voice acquired by the voice acquisition means. The output control means controls output of indication details to an output device in accordance with the degree of importance determined by the importance degree determination means.

Hereinafter, an embodiment of an indication management device capable of accurately giving an indication to an unspecified operator while using a voice input from an indicator will be described with reference to the accompanying drawings.

Meanwhile, in the present embodiment, an indication management system including the indication management device enabling a manager of a retail store to give an indication to a plurality of store clerks in charge of commodity delivery by using a voice input will be described. That is, in the present embodiment, a manager is an indicator, and a plurality of store clerks in charge of commodity delivery are unspecified operators.

Figure 1:
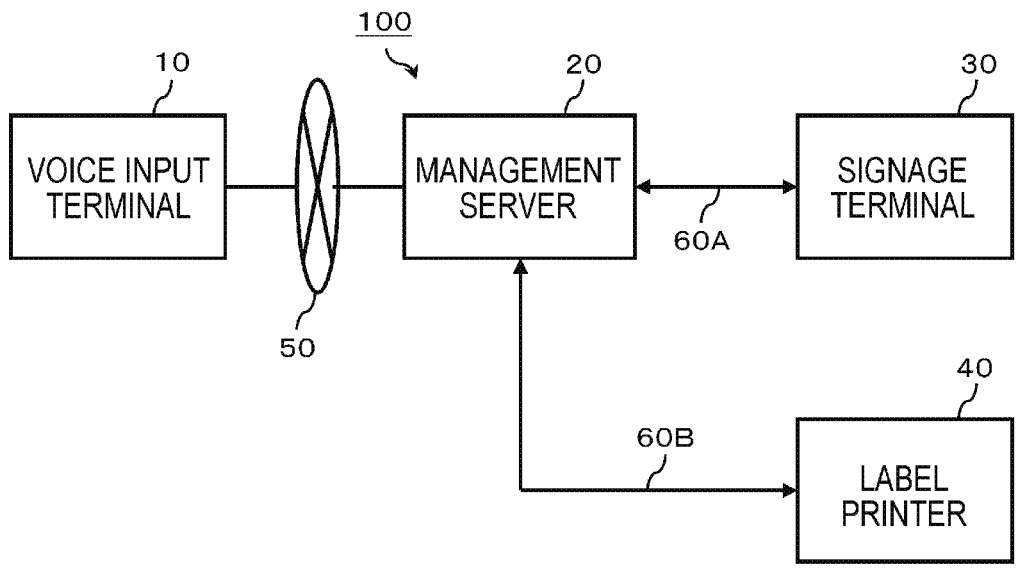
FIG. 1 is a block diagram showing a schematic configuration of an indication management system according to an embodiment.

FIG. 1 is a block diagram showing a schematic configuration of an indication management system 100 according to the present embodiment. The indication management system 100 includes a voice input terminal 10, a management server 20, a signage terminal 30, and a label printer 40.

The voice input terminal 10 is a portable terminal used by an indicator indicating an operation. The indicator carries the voice input terminal 10. The indicator is a manager of a retail store. The indicator is not limited to one person. When there is a plurality of indicators, it is preferable that each of the indictors carry the voice input terminal 10.

The indicator utters details of an indication to the voice input terminal 10 when indicating an operation. The voice input terminal 10 includes a voice input device and receives an indication of an operation through a voice. The voice input terminal 10 takes in a voice uttered by the indicator through the voice input device. The voice input terminal 10 includes a wireless communication device and transmits a signal of the voice taken in through the voice input device, that is, a voice signal as a wireless signal.

In a retail store in which the indication management system 100 is configured, a wireless local area network (LAN) 50 is constructed. The wireless LAN 50 connects the voice input terminal 10 and the management server 20 in a wireless communication manner. A voice signal transmitted from the voice input terminal 10 is transmitted to the management server 20 through the wireless LAN 50.

The management server 20 includes an interface of the wireless LAN 50 and receives a voice signal from the voice input terminal 10 through the interface. The management server 20 acquires a voice which is input by the voice input terminal 10 from the voice signal received through the interface. The management server 20 analyzes the voice and confirms details of an indication given by the indicator. In addition, the management server 20 determines the degree of importance of the indication from words included in the voice. The management server 20 controls the output of indication details to an output device in accordance with the degree of importance. A specific configuration of such a management server 20 will be described later.

A signage terminal 30 and a label printer 40 are connected to the management server 20 through respective dedicated communication lines 60A and 60B. The communication lines 60A and 60B may be wired lines or wireless lines.

The signage terminal 30 is a terminal that receives information from a display device such as a liquid crystal display or an LED display by using a digital signage technique. The signage terminal 30 is installed at a common location in a store. For example, the signage terminal 30 is installed at a backyard where a plurality of store clerks in charge of commodity delivery are on standby. The store clerks in charge of commodity delivery are operators who receive an indication from the manager and perform an operation such as commodity delivery. The signage terminal 30 displays text data indicating indication details, and the like on the display device under the control of the management server 20. The signage terminal 30 is an example of an output device.

The label printer 40 has a function of performing printing on a label on the basis of printing data received from the outside and issuing the label subjected to the printing. The label printer 40 is installed at a common location in a store. For example, the label printer 40 is installed at a backyard where store clerks in charge of commodity delivery are on standby, similar to the signage terminal 30. The label printer 40 prints text data indicating indication details, and the like on a label under the control of the management server 20. The label printer 40 is an example of an output device.

Figure 2:
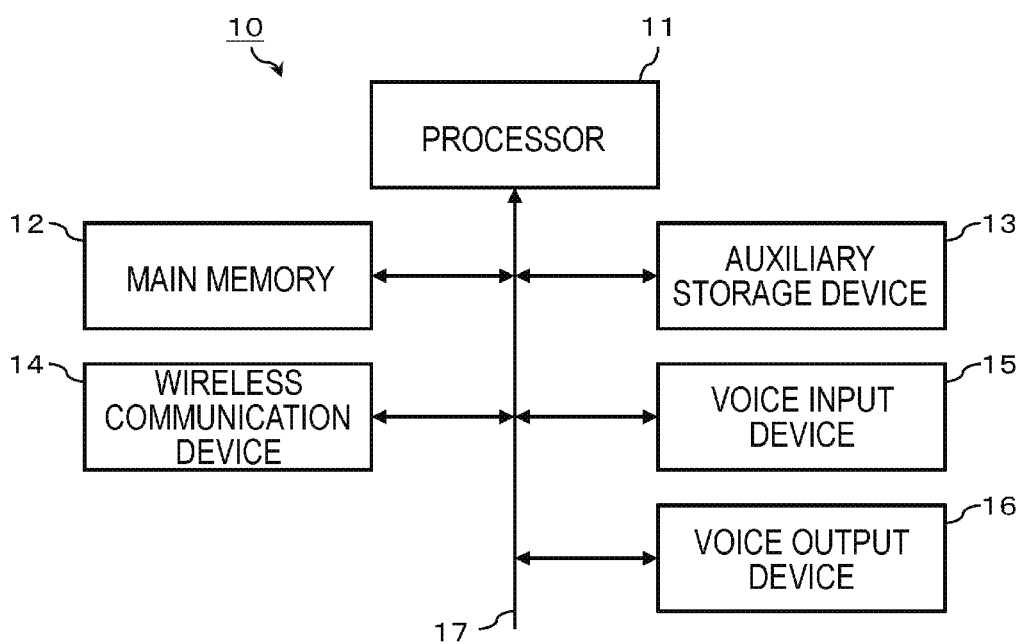
FIG. 2 is a block diagram showing a main circuit configuration of a voice input terminal constituting the system.

FIG. 2 is a block diagram showing a main circuit configuration of the voice input terminal 10. The voice input terminal 10 includes a processor 11, a main memory 12, an auxiliary storage device 13, a wireless communication device 14, a voice input device 15, a voice output device 16, and a system transmission path 17. The system transmission path 17 includes an address bus, a data bus, a control signal line, and the like. The system transmission path 17 connects the processor 11 and other units to each other directly or through a signal input and output circuit and transmits a data signal transferred therebetween. The processor 11, the main memory 12, and the auxiliary storage device 13 are connected to each other through the system transmission path 17, whereby a computer of the voice input terminal 10 is configured.

The processor 11 is equivalent to a central portion of the computer. The processor 11 controls respective units in order to realize various functions as the voice input terminal 10 in accordance with an operating system or an application program. The processor 11 is, for example, a central processing unit (CPU).

The main memory 12 is equivalent to a main storage portion of the computer. The main memory 12 includes a non-volatile memory region and a volatile memory region. The main memory 12 stores an operating system or an application program in the non-volatile memory region. The main memory 12 may store data required in executing a process for the processor 11 to control each unit in the non-volatile or volatile memory region. The main memory 12 uses the volatile memory region as a work area in which data is appropriately rewritten by the processor 11. The non-volatile memory region is, for example, a read only memory (ROM). The volatile memory region is, for example, a random access memory (RAM).

The auxiliary storage device 13 is equivalent to an auxiliary storage portion of the above-described computer. For example, an electric erasable programmable read-only memory (EEPROM), a hard disk drive (HDD), a solid state drive (SSD), and the like may serve as the auxiliary storage device 13. The auxiliary storage device 13 stores data used for the processor 11 to perform various processes, data created through a process performed by the processor 11, and the like. The auxiliary storage device 13 may store the above-described application program.

The wireless communication device 14 is connected to the wireless LAN 50. The wireless communication device 14 transmits and receives a data signal to and from the management server 20 through the wireless LAN 50 in a wireless manner.

The voice input device 15 inputs a voice uttered by an indicator. The voice input device 15 is, for example, a wireless head-set microphone.

The voice output device 16 reproduces and output a voice signal received from the management server 20. The voice output device 16 is, for example, a wireless headphone forming a set with a head-set microphone.

Figure 3:
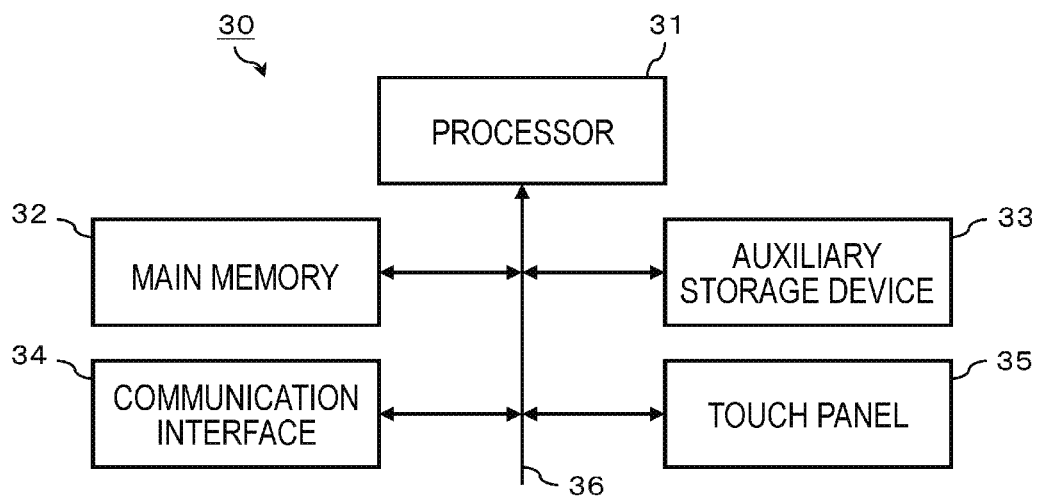
FIG. 3 is a block diagram showing a main circuit configuration of a signage terminal constituting the system.

FIG. 3 is a block diagram showing a main circuit configuration of the signage terminal 30. The signage terminal 30 includes a processor 31, a main memory 32, an auxiliary storage device 33, a communication interface 34, a touch panel 35, and a system transmission path 36. The system transmission path 36 includes an address bus, a data bus, a control signal line, and the like. The system transmission path 36 connects the processor 31 and other units to each other directly or through a signal input and output circuit and transmits a data signal transferred therebetween. The processor 31, the main memory 32, and the auxiliary storage device 33 are connected to each other through the system transmission path 36, whereby a computer of the signage terminal 30 is configured.

The description of the processor 31, the main memory 32, and the auxiliary storage device 33 overlaps the description of the processor 11, the main memory 12, and the auxiliary storage device 13 of the voice input terminal 10 described above except that the processor 31 controls respective units in order to realize various functions as the signage terminal 30. Accordingly, the description will be omitted here.

The communication interface 34 is connected to the communication line 60A. The communication interface 34 performs data communication with the management server 20 through the communication line 60A.

The touch panel 35 is equipment that also serves as a display device and an input device of the signage terminal 30. The display device is, for example, a liquid crystal display. The input device is, for example, a touch sensor.

Meanwhile, a display device such as a liquid crystal display and an input device such as an operation panel may be provided instead of the touch panel 35.

Figure 4:
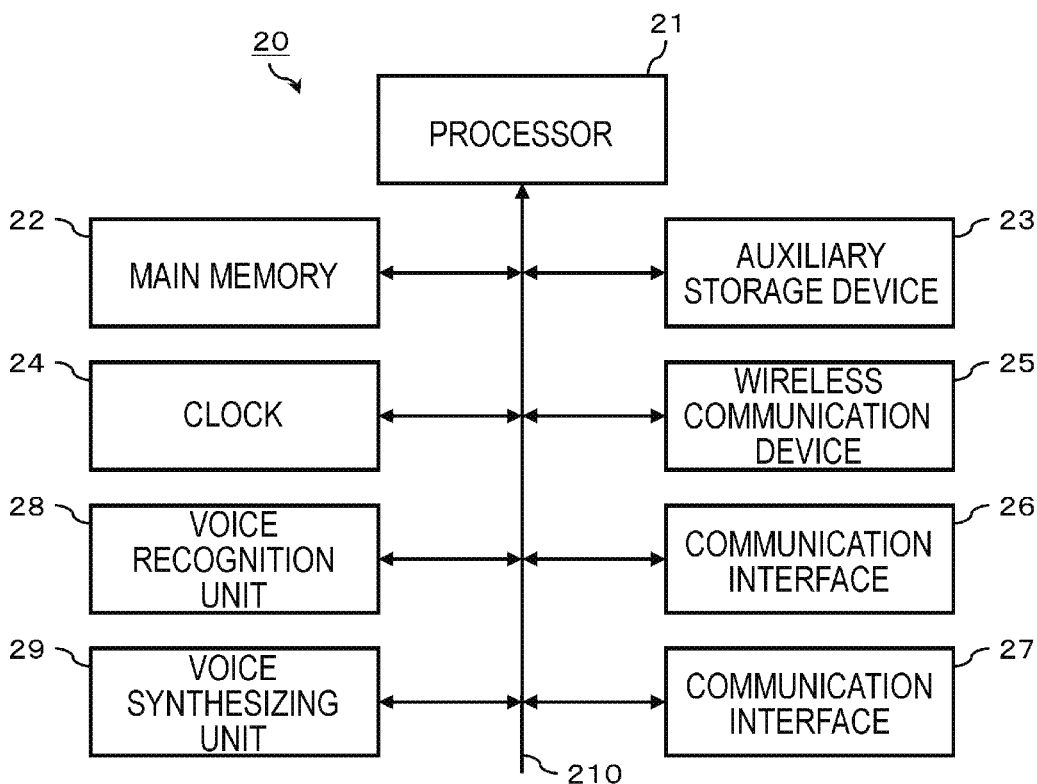
FIG. 4 is a block diagram showing a main circuit configuration of a management server constituting the system.

FIG. 4 is a block diagram showing a main circuit configuration of the management server 20. The management server 20 includes a processor 21, a main memory 22, an auxiliary storage device 23, a clock 24, a wireless communication device 25, a first communication interface 26, a second communication interface 27, a voice recognition unit 28, a voice synthesizing unit 29, and a system transmission path 210. The system transmission path 210 includes an address bus, a data bus, a control signal line, and the like. The system transmission path 210 connects the processor 21 and other units to each other directly or through a signal input and output circuit and transmits a data signal transferred therebetween. The processor 21, the main memory 22, and the auxiliary storage device 23 are connected to each other through the system transmission path 210, whereby a computer of the management server 20 is configured.

The description of the processor 21, the main memory 22, and the auxiliary storage device 23 overlaps the description of the processor 11, the main memory 12, and the auxiliary storage device 13 of the voice input terminal 10 described above except that the processor 21 controls respective units in order to realize various functions as the management server 20. Accordingly, the description will be omitted here.

The clock 24 clocks the date and time. The management server 20 acquires the date and time clocked by the clock 24 as the present date and time.

The wireless communication device 25 is connected to the wireless LAN 50. The wireless communication device 25 performs data communication with the voice input terminal 10 through the wireless LAN 50. The wireless communication device 25 functions as an interface of the wireless LAN 50.

The first communication interface 26 is connected to the communication line 60A. The first communication interface 26 performs data communication with the signage terminal 30 through the communication line 60A.

The second communication interface 27 is connected to the communication line 60B. The second communication interface 27 performs data communication with the label printer 40 through the communication line 60B.

The voice recognition unit 28 recognizes a voice from a voice signal taken in through the wireless communication device 25.

The voice synthesizing unit 29 synthesizes a voice under the control of the processor 21 and outputs the synthesized voice signal to the voice input terminal 10 through the wireless communication device 25.

Figure 5:
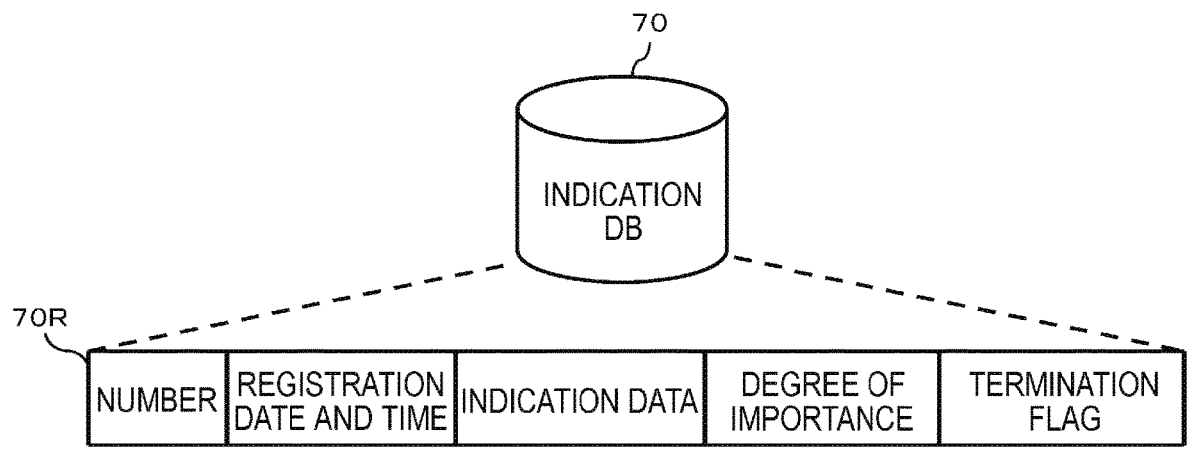
FIG. 5 is a schematic diagram illustrating an indication database included in the management server.
Figure 6:
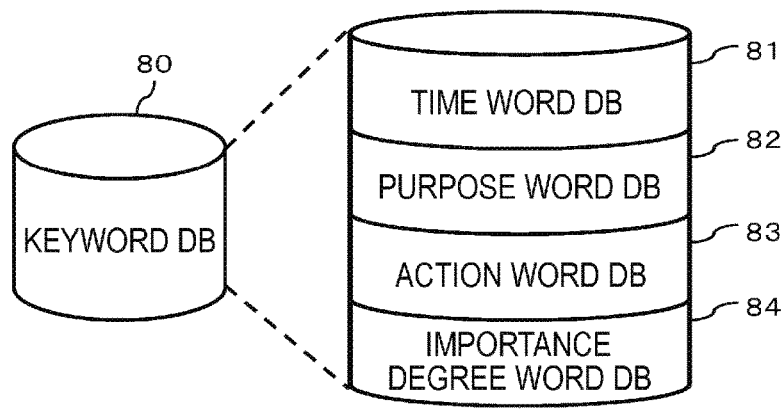
FIG. 6 is a schematic diagram illustrating a keyword database included in the management server.

The management server 20 having such a configuration includes an indication database 70 to be described using FIG. 5 and a keyword database 80 to be described using FIG. 6. The indication database 70 and the keyword database 80 are stored in the auxiliary storage device 23. Meanwhile, storage destinations of the indication database 70 and the keyword database 80 is not necessarily limited to the auxiliary storage device 23. For example, a storage device of an external server connected to the management server 20 through a network may be a storage destination of at least one of the indication database 70 and the keyword database 80. In this case, the processor 21 of the management server 20 accesses an external server as necessary to use the indication database 70 or the keyword database 80.

As shown in FIG. 5, the indication database 70 is a region for storing an indication record 70R constituted by items including a number, a registration date and time, indication data, a degree of importance, and a termination flag. In the indication record 70R, the number is a specific number which is assigned for each indication record 70R. The number is a consecutive number starting from "1". The registration date and time is a date and time when the indication record 70R is registered in the indication database 70.

The indication data is text data indicating details of an indication. The indication data is generated on the basis of a voice which is input from the voice input terminal 10. The indication data includes at least three elements of "When, What, and How" among six elements of 5W1H which are points of information transmission. The indication data may further include at least one among three elements of "Where, Who, and Why". In addition, the indication data may further include another element.

The degree of importance is a degree of importance of an indication. When an operation for the indication has high urgency, the degree of importance increases. An indication for which an operation has to be immediately started has a high degree of importance. In the present embodiment, three levels of "high", "medium", and "low" are set for a degree of importance. Meanwhile, the degree of importance is not limited to three levels. Two levels may be set, or four or more levels may be set.

The termination flag is 1-bit data for identifying whether or not an operation for an indication is terminated. In the present embodiment, a termination flag of an indication record 70R in which an operation is not terminated is set to "0", and a termination flag of an indication record 70R in which an operation is terminated is set to "1". Meanwhile, an indication record 70R in which a termination flag is set to "1" is deleted from the indication database 70, for example, after a day's work is terminated. In this case, when there is a remaining indication record 70R in which a termination flag is "0", the indication records are sorted in ascending order of a registration date and time, and a series of numbers are re-assigned in that order.

As shown in FIG. 6, the keyword database 80 includes a time word database 81, a purpose word database 82, an action word database 83, and an importance degree word database 84. The time word database 81 stores a word related to a time. Hereinafter, a word related to a time will be referred to as a time word. The time word includes words capable of specifying a time such as "10 a.m.", "15:30", and "1 hour later". In addition, the time word also includes words indicating time constraints such as "immediately", "right now", "as soon as possible (ASAP)", "quickly", "in the daytime", "tonight", and "until tomorrow".

The purpose word database 82 store a word related to a purpose. Hereinafter, a word related to a purpose will be referred to as a purpose word. The purpose word includes words representing targets of operations to be performed by store clerks in charge of commodity delivery such as "XXX (XXX is a commodity name)", "shelf", and "box".

The action word database 83 stores a word related to an action. Hereinafter, a word related to an action will be referred to as an action word. The action word includes words representing details of operations to be performed by store clerks in charge of commodity delivery such as "replenish" and "arrange".

The importance degree word database 84 stores a word related to a degree of importance. Hereinafter, a word related to a degree of importance will be referred to as an importance degree word. The importance degree word includes words having urgency, such as "immediately", "right now", "as soon as possible (ASAP)", and "quickly", among words indicating time constraints.

Figure 13:
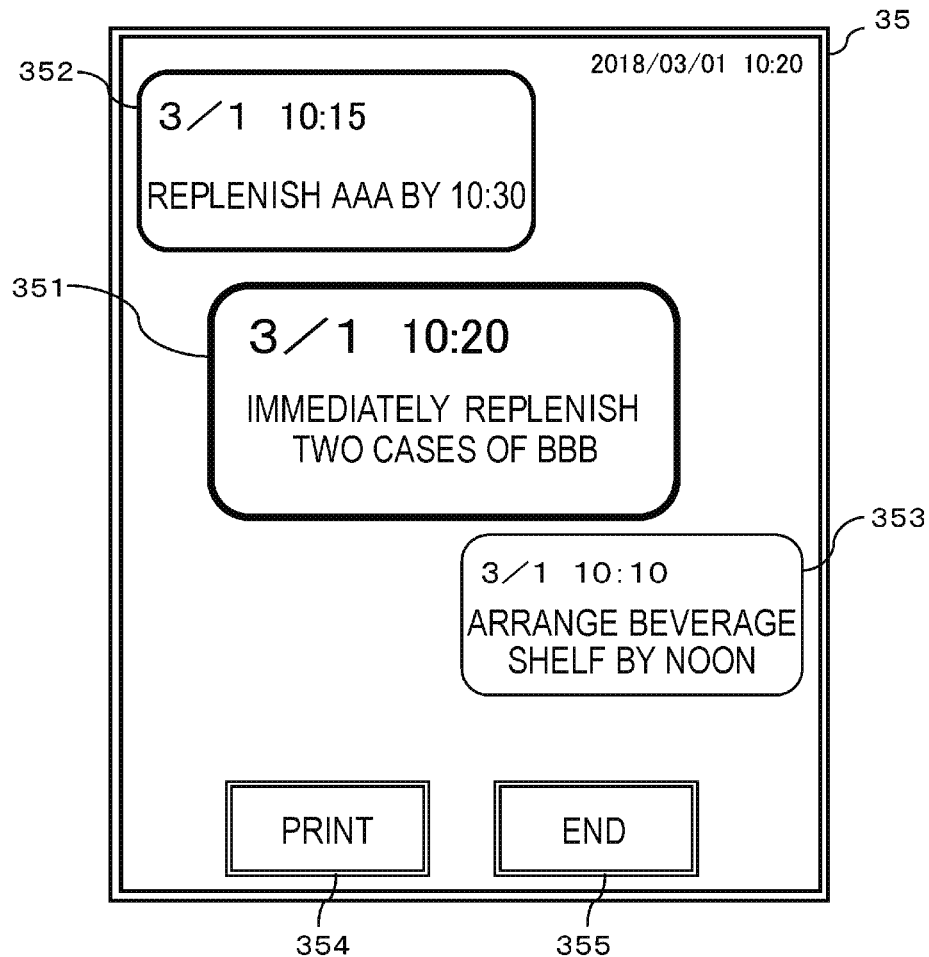
FIG. 13 is a schematic diagram showing an example of display data displayed on a touch panel of a signage terminal.
Figure 14:
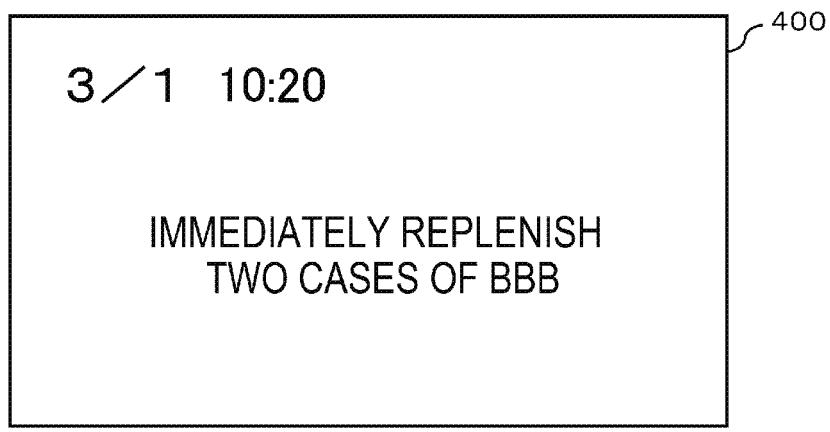
FIG. 14 is a schematic diagram showing an example of a label printed by a label printer.

FIGS. 7 to 12 are flow diagrams showing a main procedure of information processing executed by the processor 21 of the management server 20 in accordance with a control program. The control program is stored in the main memory 22 or the auxiliary storage device 23. FIG. 13 is an example of an image displayed on the touch panel 35 of the signage terminal 30, and FIG. 14 is an example of a label printed by the label printer 40. Hereinafter, operations of the indication management system 100 including the management server 20 will be described using the drawings. Meanwhile, details of an operation to be described below are an example. A procedure and details of an operation are not particularly limited as long as the same results can be obtained.

Figure 7:
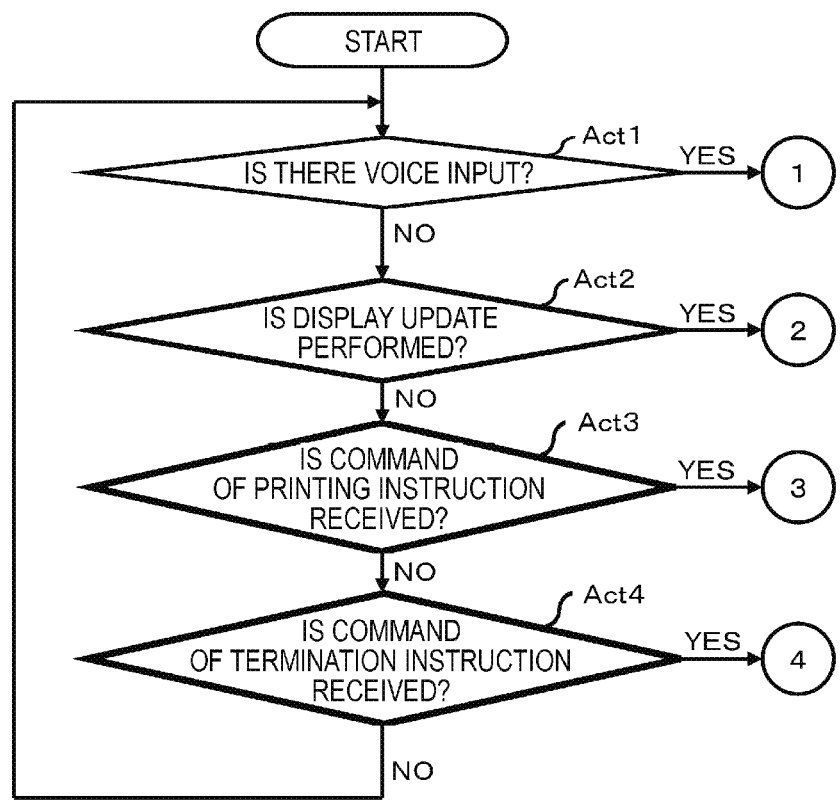
FIG. 7 is a flow diagram showing a main procedure of information processing executed by a processor of the management server in accordance with a control program.

As shown in FIG. 7, the processor 21 confirms whether or not there is a voice input as Act1. That is, the processor 21 confirms whether or not a voice signal transmitted from the voice input terminal 10 in a wireless manner is received by the wireless communication device 25. When a voice signal is not received, the processor 21 determines NO in Act1 and proceeds to Act2.

The processor 21 confirms whether or not a display update timing is set as Act2. For example, the processor 21 recognizes a display update timing whenever a time clocked by the clock 24 elapses by one minute. When a display update timing is not set, the processor 21 determines NO in Act2 and proceeds to Act3.

The processor 21 confirms whether or not a command of a printing instruction is received as Act3. The command of the printing instruction is imparted from the signage terminal 30. That is, the processor 21 confirms whether or not the command of the printing instruction is received from the signage terminal 30 through the first communication interface 26. When a command of a printing instruction is not received, the processor 21 determines NO in Act3 and proceeds to Act4.

The processor 21 confirms whether or not a command of a termination instruction is received as Act4. The command of the termination instruction is imparted from the signage terminal 30. That is, the processor 21 confirms whether or not the command of the termination instruction is received from the signage terminal 30 through the first communication interface 26. When a command of a termination instruction is not received, the processor 21 determines NO in Act4 and returns to Act1.

Here, the processor 21 waits for reception of a voice signal, setting of a display update timing, reception of a command of a printing instruction, or reception of a command of a termination instruction in the processes of Act1 to Act4.

For example, it is assumed that a manager carrying the voice input terminal 10 utters "arrange a beverage shelf" as a first indication at 10:10 a.m. on March 1. Then, a voice signal accompanying details of this utterance is transmitted as a wireless signal. The voice signal is received by the wireless communication device 25 of the management server 20 through the wireless LAN 50. When the voice signal is received by the wireless communication device 25, the processor 21 determines YES in Act2 and proceeds to Act11 of FIG. 8.

The processor 21 instructs the voice recognition unit 28 to analyze the voice signal and recognize a voice as Act11. Since the voice is recognized by the voice recognition unit 28 in response to the instruction, the processor 21 retrieves the time word database 81 as Act12 and confirms whether or not a time word is included in the voice.

When a time word is included in the voice, the processor 21 determines YES in Act12 and proceeds to Act13. The processor 21 sets a time flag F1 to "0" as Act13. The time flag F1 is 1-bit data stored in the volatile memory region of the main memory 22. When a time word is not included in the voice, the processor 21 determines NO in Act12 and proceeds to Act14. The processor 21 sets the above-described time flag F1 to "1" as Act14.

When the process of Act13 or Act14 is terminated, the processor 21 proceeds to Act15. The processor 21 retrieves the purpose word database 82 as Act15 and confirms whether or not a purpose word is included in the voice.

When a purpose word is included in the voice, the processor 21 determines YES in Act15 and proceeds to Act16. The processor 21 sets a purpose flag F2 to "0" as Act16. The purpose flag F2 is 1-bit data stored in the volatile memory region of the main memory 22. When a purpose word is not included in the voice, the processor 21 determines NO in Act15 and proceeds to Act17. The processor 21 sets the above-described purpose flag F2 to "1" as Act17.

When the process of Act16 or Act17 is terminated, the processor 21 proceeds to Act18. The processor 21 retrieves the action word database 83 as Act18 and confirms whether or not an action word is included in the voice.

When an action word is included in the voice, the processor 21 determines YES in Act18 and proceeds to Act19. The processor 21 sets an action flag F3 to "0" as Act19. The action flag F3 is 1-bit data stored in the volatile memory region of the main memory 22. When an action word is not included in the voice, the processor 21 determines NO in Act18 and proceeds to Act20. The processor 21 sets the above-described action flag F3 to "1" as Act20.

When the process of Act19 or Act20 is terminated, the processor 21 proceeds to Act21. The processor 21 confirms whether or not at least one flag, among the time flag F1, the purpose flag F2, and the action flag F3, is set to "1" as Act21. When all of the time flag F1, the purpose flag F2, and the action flag F3 are set to "0", the processor 21 determines NO in Act21 and proceeds to Act31 of FIG. 9.

On the other hand, when at least one flag, among the time flag F1, the purpose flag F2, and the action flag F3, is set to "1", the processor 21 determines YES in Act21 and proceeds to Act22. The processor 21 instructs the voice synthesizing unit 29 to synthesize a voice for requesting a missing word as Act22. Specifically, when the time flag F1 is set to "1", an instruction for synthesizing a voice of, for example, "please add a time word to an instruction" is given. When the purpose flag F2 is set to "1", an instruction for synthesizing a voice of, for example, "please add a purpose word to an instruction" is given. When the time flag F1 and the action flag F3 are set to "1", an instruction for synthesizing a voice of, for example, "please add a time word and an action word to an instruction" is given. The voice synthesizing unit 29 synthesizes a voice for requesting a missing word in response to the instruction.

When the voice for requesting a missing word is synthesized, the processor 21 proceeds to Act23. The processor 21 controls the wireless communication device 25 so as to transmit a signal of the synthesized voice to the voice input terminal 10 as Act23. By this control, a voice signal is transmitted to the voice input terminal 10 through the wireless LAN 50 in a wireless manner. In the voice input terminal 10 receiving the voice signal, a synthesized voice is output from the voice output device 16.

In a case of the above-described first indication, the "shelf" is a purpose word, and the "arrange" is an action word. However, the first indication does not include a time word. Therefore, in the management server 20, a voice of "please add a time word to an instruction" is synthesized. In addition, this voice is output from the voice input terminal 10 of the manager. Consequently, it is assumed that the manager utters, for example, "arrange beverage shelf by noon" as a second indication. Then, the "by noon" is recognized as a time word this time, and thus the processor 21 proceeds to the process of Act31.

The processor 21 retrieves the importance degree word database 84 as Act31 and confirms whether or not an importance degree word is included in the voice. When an importance degree word is included in the voice, the processor 21 determines YES in Act31 and proceeds to Act38. The processor 21 sets a degree of importance of the indication to "high" as Act38.

On the other hand, when an importance degree word is not included in the voice, the processor 21 determines NO in Act31 and proceeds to Act32. The processor 21 confirms whether or not a word capable of specifying a time is included in the voice as Act32. When a word capable of specifying a time is not included in the voice, the processor 21 determines NO in Act32 and proceeds to Act36. The processor 21 sets a degree of importance of the indication to "low" as Act36.

On the other hand, when a word capable of specifying a time is included in the voice, the processor 21 determines YES in Act32 and proceeds to Act33. The processor 21 acquires a date and time clocked by the clock 24 and calculates a required time t from the date and time to a time specified using the word as Act33. When the calculation of the required time t is terminated, the processor 21 proceeds to Act34.

The processor 21 confirms whether or not the required time t is shorter than a first threshold time T1 as Act34. The first threshold time T1 is a time serving as a threshold value regarding whether the first threshold time T1 is a time to be determined to have urgency. The first threshold time T1 is freely set by a user of the indication management system 100. The first threshold time T1 may be set by a facility manager of the indication management system 100. In the present embodiment, the first threshold time T1 is set to 5 minutes.

When the required time t is shorter than the first threshold time T1, the processor 21 determines YES in Act34 and proceeds to Act38. That is, the processor 21 sets a degree of importance of the indication to "high".

On the other hand, when the required time t is equal to or longer than the first threshold time T1, the processor 21 determines NO in Act34 and proceeds to Act35. The processor 21 confirms whether or not the required time t is shorter than the second threshold time T2 as Act35. The second threshold time T1 is a time serving as a threshold value regarding whether the required time t is longer than the first threshold time T1 but is a time to be determined to have urgency. The second threshold time T2 is set to be a time longer than the first threshold time T1 by the user of the indication management system 100. The second threshold time T2 may be set by the facility manager of the indication management system 100. In the present embodiment, the second threshold time T2 is set to 15 minutes.

When the required time t is shorter than the second threshold time T2, the processor 21 determines YES in Act35 and proceeds to Act37. The processor 21 sets a degree of importance of the indication to "medium" as Act37.

On the other hand, when the required time t is equal to or longer than the second threshold time T2, the processor 21 determines NO in Act35 and proceeds to Act36. That is, the processor 21 sets a degree of importance of the indication to "low".

When the process of Act36, Act37, or Act38 is terminated, the processor 21 proceeds to Act39. The processor 21 adds a number, a registration date and time, a degree of importance, and a termination flag to indication data recognized from the voice to create an indication record 70R as Act39. The number is a value obtained by adding "1" to the number of records N of the indication record 70R stored in the indication database 70. The registration date and time is a date and time clocked by the clock 24. The degree of importance is data which is set in the process of Act36, Act37, or Act38. The termination flag is a value "0" indicating non-termination.

When the creation of the indication record 70R is terminated, the processor 21 proceeds to Act40. The processor 21 registers the indication record 70R in the indication database 70 as Act40. Thus, the processor 21 terminates the processing performed when a voice signal is received.

When a voice signal of the second indication "arrange beverage shelf by noon" is received, an importance degree word is not included in the voice. On the other hand, "noon" is included in the voice as a word capable of specifying a time. Here, when the time of noon is set to 12:00, a required time t is 1 hour or more. Therefore, a degree of importance of the indication is set to "low". Thus, an indication record 70R (2) for the second indication "arrange beverage shelf by noon" is registered in the indication database 70 by setting the degree of importance to "low". Incidentally, the indication record 70R (2) indicates an indication record for the second indication. Hereinafter, an indication record for an m-th indication will be indicated by an indication record 70R (m).

Here, it is assumed that a manager utters "replenish commodity AAA by 10:30" as a third indication at 10:15 on the same day. In this case, the "10:30" is recognized as a time word, the "commodity AAA" is recognized as a purpose word, and the "replenish" is recognized as an action word. Although an importance degree word is not included, the word "10:30" capable of specifying a time is included, and thus a required time t is calculated. In this case, the required time t is 15 minutes, which is equal to or longer than the second threshold time T2. Therefore, in the management server 20, an indication record 70R (3) for the third indication "replenish a commodity AAA by 10:30" is registered in the indication database 70 by setting the degree of importance to "low".

Next, information processing performed when a display update timing is set will be described.

Figure 10:
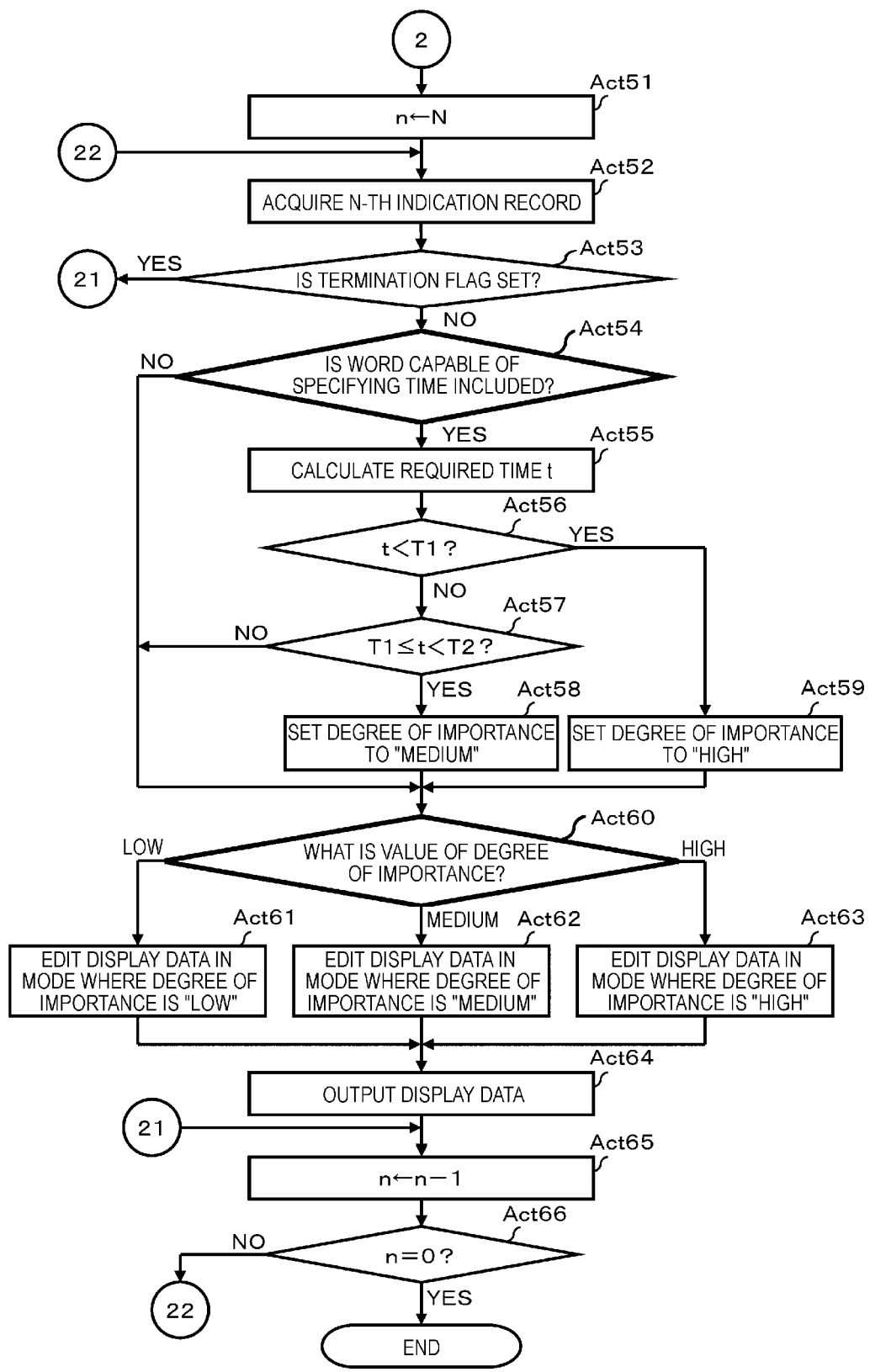
FIG. 10 is a flow diagram showing a main procedure of information processing executed by the processor of the management server in accordance with a control program.

When a time clocked by the clock 24 elapses by one minute and a display update timing is set in the waiting states of Act1 to Act4, the processor 21 determines YES in Act2 and proceeds to Act51 of FIG. 10.

The processor 21 sets an initial value of a subtraction counter n to the number of records N of the indication record 70R stored in the indication database 70 as Act51. The subtraction counter n is formed in the volatile memory region of the main memory 22.

When the initial value of the subtraction counter n is set to the number of records N of the indication record 70R, the processor 21 proceeds to Act52. The processor 21 acquires an indication record 70R having the value of the subtraction counter n as a number from the indication database 70 as Act52.

When an indication record 70R having the value of the subtraction counter n as a number can be acquired, the processor 21 proceeds to Act53. The processor 21 examines a termination flag of the indication record 70R as Act53.

When the termination flag is a value "1" indicating termination, the processor 21 determines YES in Act53 and proceeds to Act65. The processor 21 counts down the subtraction counter n by "1" in Act65. Thereafter, the processor 21 proceeds to Act66. The processor 21 confirms whether or not the subtraction counter n is set to "0" as Act66. When the subtraction counter n is not "0", that is, equal to or greater than "1", the processor 21 returns to Act52. The processor 21 acquires an indication record 70R having the value of the subtraction counter n as a number from the indication database 70 as Act52. In addition, the processor 21 examines a termination flag of the indication record 70R as Act53.

On the other hand, when the termination flag is a value "0" indicating non-termination, the processor 21 determines NO in Act53 and proceeds to Act54. The processor 21 confirms whether or not a word capable of specifying a time is included in indication data of the indication record 70R as Act54. When a word capable of specifying a time is not included in the indication data, the processor 21 determines NO in Act54 and proceeds to Act60.

On the other hand, when a word capable of specifying a time is included in the indication data, the processor 21 determines YES in Act54 and proceeds to Act55. The processor 21 acquires a date and time clocked by the clock 24 and calculates a required time t from the date and time to a time specified using the word as Act55. When the calculation of the required time t is terminated, the processor 21 proceeds to Act56.

The processor 21 confirms whether or not the required time t is shorter than the above-described first threshold time T1 as Act56. When the required time t is shorter than the first threshold time T1, the processor 21 determines YES in Act56 and proceeds to Act59. The processor 21 sets a degree of importance of indication data to "high" as Act59. Thereafter, the processor 21 proceeds to Act60.

On the other hand, when the required time t is equal to or longer than the first threshold time T1, the processor 21 determines NO in Act56 and proceeds to Act57. The processor 21 confirms whether or not the required time t is shorter than the above-described second threshold time T2 as Act57. When the required time t is shorter than the second threshold time T2, the processor 21 determines YES in Act57 and proceeds to Act58. The processor 21 sets a degree of importance of the indication data to "medium" as Act58. Thereafter, the processor 21 proceeds to Act60.

On the other hand, when the required time t is equal to or longer than the second threshold time T2, the processor 21 determines NO in Act57 and proceeds to Act60. In this case, a degree of importance of the indication data remains "low".

Here, when a word capable of specifying a time is not included in the indication data in Act54 as described above, when the required time t is equal to or longer than the second threshold time T2 in Act57, or when the process of Act58 or Act59 is terminated, the processor 21 proceeds to Act60.

The processor 21 confirms the degree of importance of the indication data as Act60. Here, when the degree of importance is "low", the processor 21 proceeds to Act61. The processor 21 edits display data representing indication details of the indication data in a mode of the degree of importance "low" as Act61. On the other hand, when the degree of importance is "medium", the processor 21 proceeds to Act62. The processor 21 edits display data representing indication details of the indication data in a mode of the degree of importance "medium" as Act62. On the other hand, when the degree of importance is "high", the processor 21 proceeds to Act63. The processor 21 edits display data representing indication details of the indication data in a mode of the degree of importance "high" as Act63.

Here, the editing in a mode of the degree of importance "low", "medium" or "high" refers to editing display data so that indication details become more conspicuous as the degree of importance increases. For example, the color of characters indicating the indication details or the thickness of a frame line surrounding the characters is changed. Alternatively, the size of the characters is increased or reduced. Then, the display data is edited so that the indication data of the degree of importance "medium" becomes more conspicuous than the indication data of the degree of importance "low" and the indication data of the degree of importance "high" becomes more conspicuous than the indication data of the degree of importance "medium".

When the process of Act61, Act62, or Act63 is terminated, the processor 21 proceeds to Act64. The processor 21 controls the first communication interface 26 so as to output the display data edited in the mode of the degree of importance "low", "medium", or "high" to the signage terminal 30 as Act64. By this control, the display data edited in the mode of the degree of importance "low", "medium", or "high" is transmitted to the signage terminal 30 through the communication line 60A. As a result, the display data edited in the mode of the degree of importance "low", "medium", or "high", that is, indication details of indication data is displayed on the touch panel 35 of the signage terminal 30.

The processor 21 finishing outputting the display data to the signage terminal 30 proceeds to Act65. That is, the processor 21 subtracts the subtraction counter n by "1" and confirms whether or not the subtraction counter n is set to "0". In addition, when the subtraction counter n is not set to "0", the processor 21 returns to Act52.

In this manner, the processor 21 repeatedly executes the processes of Act53 to Act65 whenever the indication record 70R is acquired from the indication database 70 until the subtraction counter n is set to "0". In addition, when the subtraction counter n is set to "0", the processor 21 determines YES in Act66 and terminates the processing performed when a display update timing is set.

When a time is updated at 10:16 and a display update timing is set after the above-described third indication is terminated, a required time t calculated from the word "10:30" capable of specifying a time of the indication record 70R (3) is set to 14 minutes. Since this required time t is shorter than the second threshold time T2, a degree of importance of the indication record 70R (3) is changed from "low" to "medium". As a result, display data indicating indication details of the indication record 70R (3) is edited in a mode of the degree of importance "medium" and displayed on the touch panel 35 of the signage terminal 30. On the other hand, display data indicating the indication details of the indication record 70R (2) is edited in a mode of the degree of importance "low" and displayed on the touch panel 35 of the signage terminal 30.

Thereafter, it is assumed that the manager utters "immediately replenish two cases of a commodity AAA" as a fourth indication at 10:20. In this case, the "immediately" is recognized as a time word, the "commodity BBB" is recognized as a purpose word, and the "replenish" is recognized as an action word. In addition, the "immediately" is recognized as an importance degree word. As a result, a degree of importance of an indication record 70R (4) for the fourth indication is set to "high".

When a display update timing is set at this point in time, display data indicating indication details of the indication record 70R (4) is edited in a mode of the degree of importance "high" and displayed on the touch panel 35 of the signage terminal 30. On the other hand, the display data indicating the indication details of the indication record 70R (3) is edited in the mode of the degree of importance "medium" and displayed on the touch panel 35 of the signage terminal 30 because the required time t is 10 minutes. In addition, the display data indicating the indication details of the indication record 70R (2) is edited in the mode of the degree of importance "low" and displayed on the touch panel 35 of the signage terminal 30.

FIG. 13 is a schematic diagram showing a display example of the touch panel 35. In FIG. 13, display data 351 indicates indication details of the indication record 70R (4), display data 352 indicates indication details of the indication record 70R (3), and display data 353 indicates indication details of the indication record 70R (2).

As shown in the drawing, regarding the display data 351, indication details "immediately replenish two cases of BBB" are displayed in a font larger than those of the other display data 352 and 353. In addition, a frame line surrounding the indication details of the display data 351 is thicker than frame lines surrounding the indication details of the other display data 352 and 353. As a result, the indication details of the display data 351 are displayed more conspicuously than the indication details of the other display data 352 and 353. Therefore, a store clerk in charge of commodity delivery who confirms details displayed on the touch panel 35 can know that two cases of the commodity BBB have to be replenished immediately.

On the other hand, regarding the display data 352, indication details "replenish AAA by 10:30" are displayed in a font larger than that of the display data 353. In addition, a frame line surrounding the indication details is also thicker than a frame line surrounding the indication details of the display data 353. As a result, the indication details of the display data 352 are displayed more conspicuously than the indication details of the other display data 353. Therefore, a store clerk in charge of commodity delivery terminates the commodity delivery of the commodity BBB and then can know that the commodity AAA has to be replenished by 10:30.

Incidentally, when a time clocked by the clock 24 is set to 10:26, the degree of importance in the indication record 70R (3) is changed from "medium" to "high". As a result, the display data 352 is displayed in the same mode as the display data 351 in FIG. 13. Similarly, when the time is set to 11:46, the degree of importance in the indication record 70R (2) is changed from "low" to "medium". As a result, the display data 353 is displayed in the same mode as the display data 352 in FIG. 13. Further, when the time is set to 11:56, the degree of importance in the indication record 70R (2) is changed from "medium" to "high". As a result, the display data 353 is displayed in the same mode as the display data 351 in FIG. 13.

Incidentally, as shown in FIG. 13, button images of a printing button 354 and a termination button 355 are displayed on the touch panel 35. For example, a store clerk executing an indication of the display data 351 touches the inside of the frame line of the display data 351 to set the display data 351 to be in a selected state. When a selected state is set, for example, the frame line of the display data 351 blinks, and thus the store clerk touches the printing button 354. Then, the processor 31 of the signage terminal 30 generates a command of a printing instruction. In addition, the processor 31 controls the communication interface 34 so as to transmit the command of the printing instruction to the management server 20. By this control, the command of the printing instruction is transmitted from the signage terminal 30 to the management server 20. The command of the printing instruction includes information with which the display data 351 set to be in a selected state can be identified.

Figure 11:
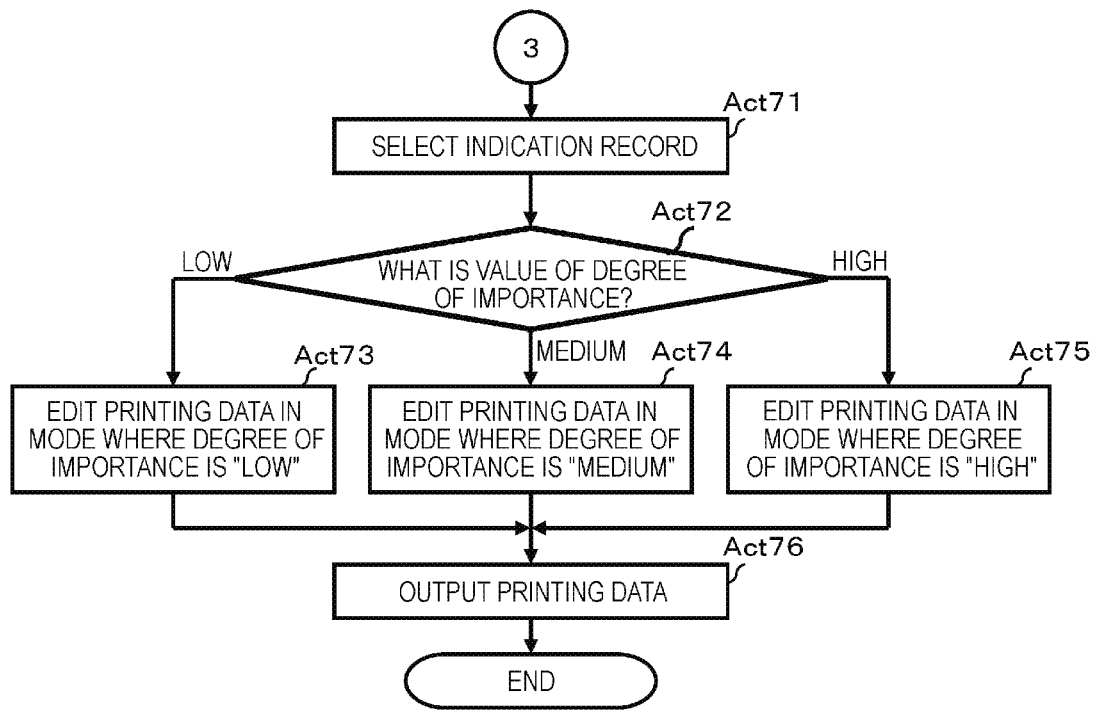
FIG. 11 is a flow diagram showing a main procedure of information processing executed by the processor of the management server in accordance with a control program.

The processor 21 of the management server 20 receiving the command of the printing instruction through the first communication interface 26 determines YES in Act3 of FIG. 7, and proceeds to Act71 of FIG. 11. The processor 21 selects an indication record 70R equivalent to the display data 351 set to be in a selected state from the indication database 70 from information included in the command of the printing instruction. In addition, the processor 21 proceeds to Act72.

The processor 21 determines the degree of importance of the indication record 70R as Act72. In addition, the processor 21 proceeds to Act73 when the degree of importance is "low". The processor 21 edits printing data representing indication details of indication data in the mode of the degree of importance "low" as Act73. The processor 21 proceeds to Act74 when the degree of importance is "medium". The processor 21 edits printing data representing indication details of indication data in the mode of the degree of importance "medium" as Act74. The processor 21 proceeds to Act75 when the degree of importance is "high". The processor 21 edits printing data representing indication details of indication data in the mode of the degree of importance "high" as Act75.

Here, the editing in the mode of the degree of importance "low", "medium", or "high" is the same as in the case of display data. That is, the processor 21 edits printing data so that indication details become more conspicuous as the degree of importance increases.

When the process of Act73, Act74, or Act75 is terminated, the processor 21 proceeds to Act76. The processor 21 controls the second communication interface 27 so as to output the printing data edited in the mode of the degree of importance "low", "medium", or "high" to the label printer 40 as Act76. By this control, the printing data edited in the mode of the degree of importance "low", "medium", or "high" is transmitted to the label printer 40 through the communication line 60B. As a result, in the label printer 40, the printing data edited in the mode of the degree of importance "low", "medium", or "high", that is, indication details of display data are printed on a label, and the label is issued.

FIG. 14 is an example of a label 400 issued from the label printer 40 by a store clerk selecting the display data 351 and then touching the printing button 354. As shown in the drawing, the indication details "immediately replenish two cases of BBB" of the display data 351 are printed on the label 400. A font in this case has a size larger than that when the other display data 352 and 353 are selected. Thus, the store clerk can start the indicated operation with the label on which the indication details "immediately replenish two cases of BBB" of the display data 351 are printed. Therefore, it is possible to eliminate an operation error.

The processor 21 controlling the output of the printing data terminates the processing performed when the command of the printing instruction is received.

The store clerk terminating the operation confirms that the display data 351 indicating the indication details of the operation is set to be in a selected state and then touches the termination button 355. Then, the processor 31 of the signage terminal 30 generates a command of a termination instruction. In addition, the processor 31 controls the communication interface 34 so as to transmit the command of the termination instruction to the management server 20. By this control the command of the termination instruction is transmitted from the signage terminal 30 to the management server 20. The command of the termination instruction includes information with which the display data 351 set to be in a selected state can be identified.

Figure 12:
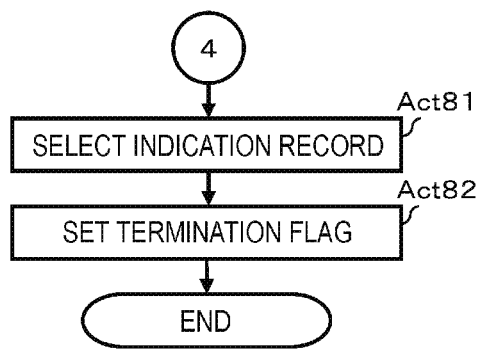
FIG. 12 is a flow diagram showing a main procedure of information processing executed by the processor of the management server in accordance with a control program.

The processor 21 of the management server 20 receiving the command of the termination instruction through the first communication interface 26 determines YES in Act4 of FIG. 7, and proceeds to Act81 of FIG. 12. The processor 21 selects an indication record 70R equivalent to the display data 351 set to be in a selected state from the indication database 70 from information included in the command of the termination instruction as Act81. In addition, the processor 21 proceeds to Act82. The processor 21 changes a termination flag of the indication record 70R from a value "0" indicating non-termination to a value "1" indicating termination as Act82. Thus, the processor 21 terminates the processing performed when a command of a termination instruction is received.

In this manner, for example, when the store clerk terminating an operation indicated using the display data 351 touches the termination button 355, a termination flag of the indication record 70R (4) equivalent to the display data 351 is set to "0". When the termination flag is set to "0", the processing shown by Act54 to Act64 of FIG. 10 is not executed for the indication record 70R (4). As a result, the display data 351 of the indication record 70R (4) set to be in a selected state is erased from the touch panel 35.

In this manner, display data set to be in a selected state in the touch panel 35 indicates that the store clerk is executing an operation indicated using the commodity data. In addition, when the operation is terminated, the display data is erased from the touch panel 35. Therefore, two or more store clerks do not duplicate an operation indicated using display data.

Figure 8:
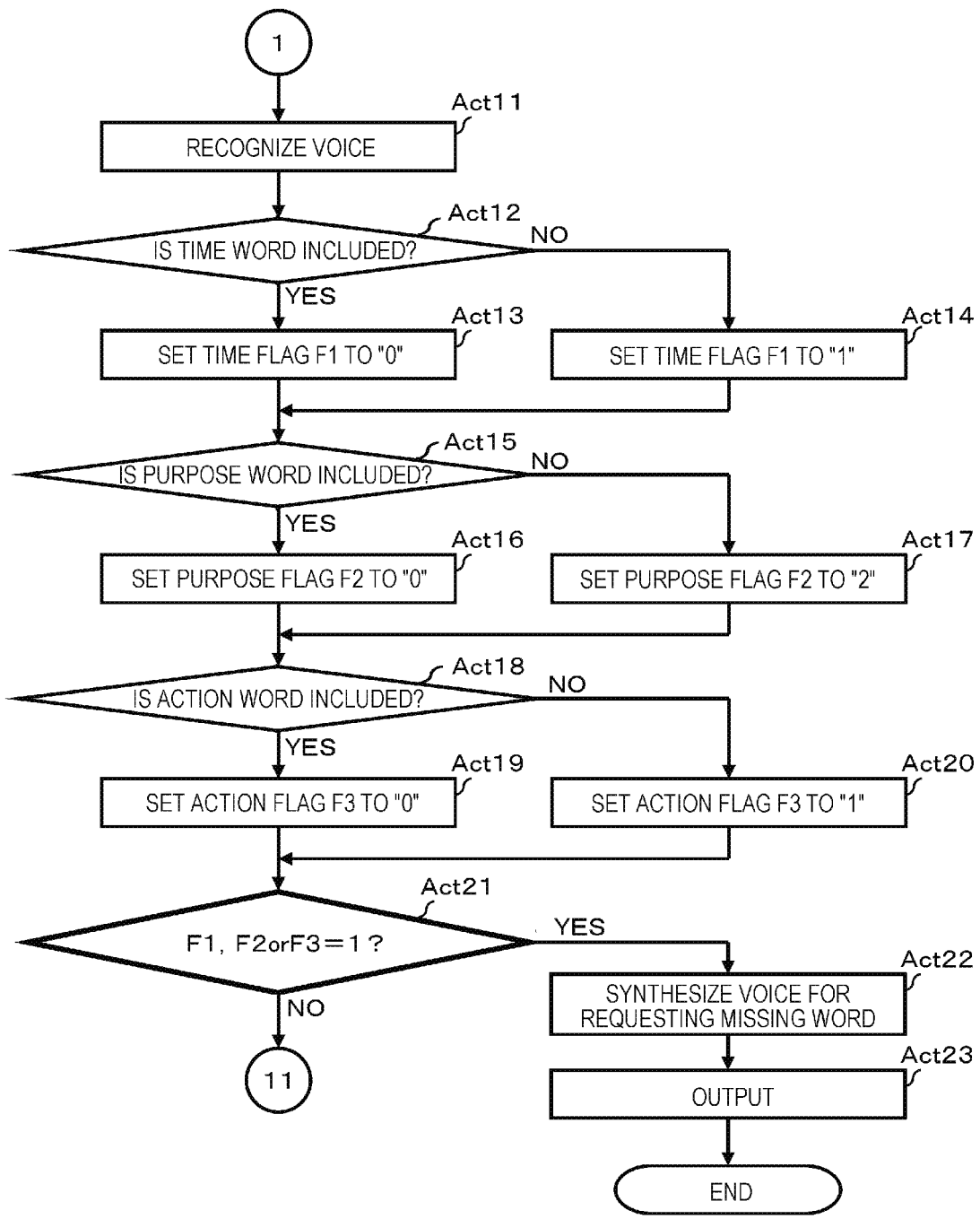
FIG. 8 is a flow diagram showing a main procedure of information processing executed by the processor of the management server in accordance with a control program.
Figure 9:
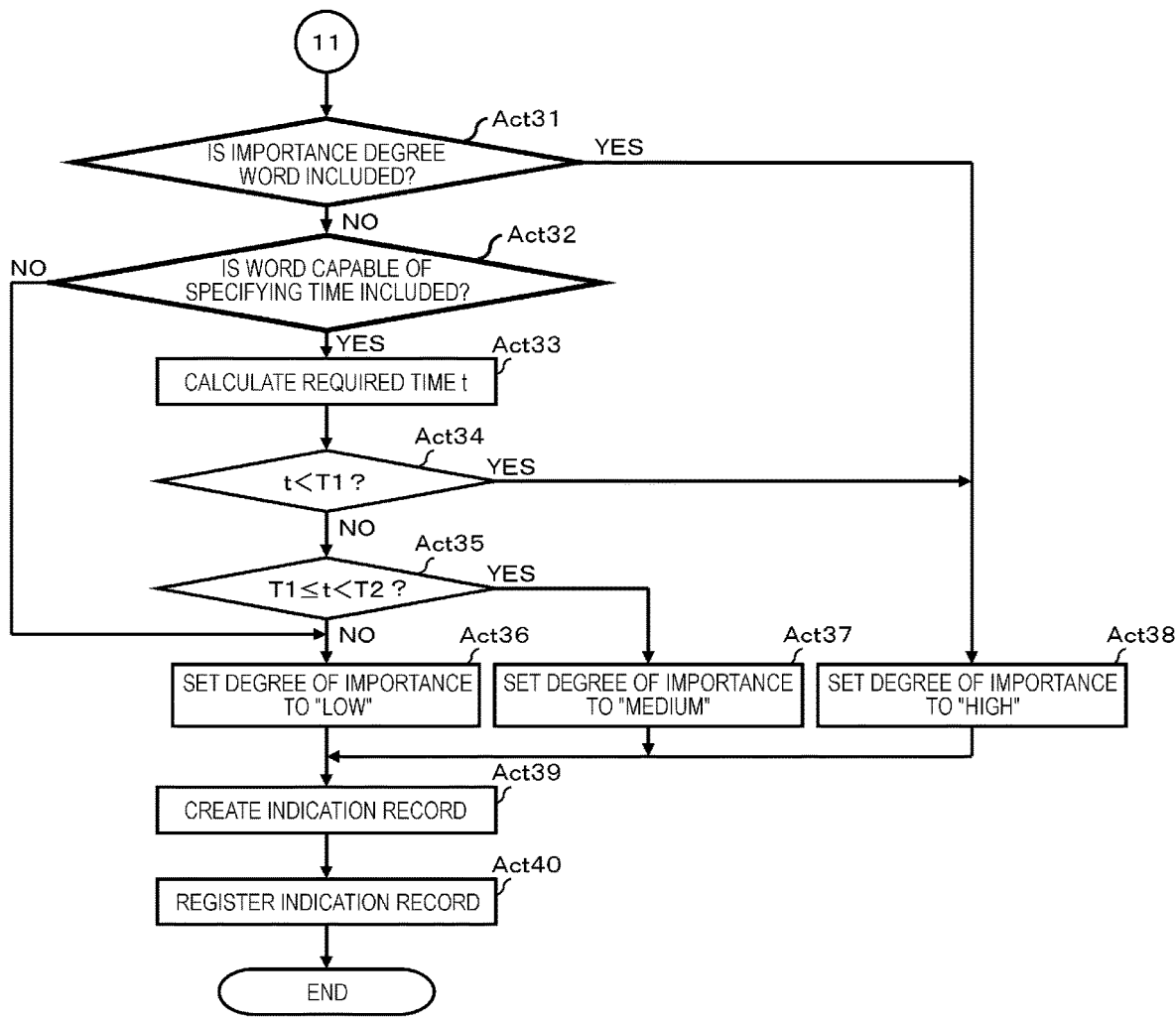
FIG. 9 is a flow diagram showing a main procedure of information processing executed by the processor of the management server in accordance with a control program.

Here, a computer having the processor 21 as a main body executes the process of Act11 of FIG. 8 in cooperation with the wireless communication device 25 and the voice recognition unit 28 to constitute a voice acquisition unit for acquiring a voice input by the voice input terminal 10. In addition, the computer executes the processes of Act12 to Act21 of FIG. 8 and the processes of Act39 and Act40 of FIG. 9 to constitute an indication recognition unit for recognizing details of an indication from a voice acquired by the voice acquisition unit. In addition, the computer executes the processes of Act21 to Act23 of FIG. 8 in cooperation with the voice synthesizing unit 29 to constitute a requesting unit for confirming whether or not a word necessary for recognition details of an indication is included in a voice and requesting a user of the voice input terminal 10 to input a voice again when the word is not included in the voice. In addition, the computer executes the processes of Act31 to Act38 of FIG. 9 and the processes of Act54 to Act59 of FIG. 10 to constitute an importance degree determination unit for determining a degree of importance of an indication from a voice acquired by the voice acquisition unit. In addition, the computer executes the processes of Act60 to Act64 of FIG. 10 and the processes of Act72 to Act76 of FIG. 11 to constitute an output control unit for controlling the output of indication details to an output device in accordance with the degree of importance determined by the determination unit.

That is, the output control unit includes a display control unit related to the processes of Act60 to Act64 and a printing control unit for controlling printing related to the processes of Act72 to Act76.

As described above in detail, when acquiring a voice which is input by the voice input terminal 10, the management server 20 of the present embodiment recognizes details of an indication from the voice and determines a degree of importance of the indication. In addition, the management server 20 controls the output of indication details to the signage terminal 30 in accordance with a degree of importance. Specifically, indication details having a high degree of importance are output in an emphasized manner as compared to indication details having a low degree of importance.

Therefore, a manager of a retail store who is a user of the voice input terminal 10 can give an indication to a store clerk in charge of commodity delivery who is at a location where the signage terminal 30 is installed by using a voice input. In addition, the indication is displayed on the touch panel 35 of the signage terminal 30 so that an indication having a higher degree of importance becomes more conspicuous. Therefore, an indication having a high degree of importance is neither buried in an indication having a low degree of importance nor missed. Thus, it is possible to provide the management server 20 capable of accurately giving an indication to an unspecified store clerk while using a voice input.

In addition, when a word necessary for recognition details of an indication is not included in a voice which is input by the manager of the retail store, the management server 20 requests the manager to input a voice again. Therefore, an indication that cannot be understood by the store clerk serving as an operator is not displayed on the touch panel 35 of the signage terminal 30. Thus, from this point, an effect of providing the management server 20 capable of accurately giving an indication to an unspecified store clerk while using a voice input is exhibited.

In addition, the management server 20 determines a degree of importance of an indication in accordance with whether or not a word representing a degree of importance is included in a voice. Therefore, the manager of the retail store can increase the degree of importance of an indication simply by inserting a word such as "immediately", "right now", "as soon as possible (ASAP)", or "quickly" into the indication.

In addition, when a word representing a time is included in a voice, the management server 20 calculates a required time by the time and determines a degree of importance of an indication in accordance with the length of the required time. Therefore, a degree of importance increases automatically as a required time by a time included in an indication approaches, and the indication becomes conspicuous in proportion to the increase, thereby eliminating a concern that a store clerk may miss an important indication.

While the embodiment of the indication management device capable of accurately giving an indication to an unspecified operator while using a voice input from an indication is described, but such an embodiment is not limited thereto.

For example, the importance degree determination unit is not limited to the embodiment. In general, when an indicator issues an important instruction, it is considered that the voice becomes loud, the tone of the voice becomes high, or the voice becomes fast. Consequently, a degree of importance may be determined using the volume of a voice of an indicator, the level of tone, the speed of utterance, and the like as determination materials.

For example, editing of display data or printing data based on a degree of importance is not limited to the example described in the embodiment. For example, the type of font may be changed in accordance with a degree of importance, and the size of a frame line may be changed in accordance with a degree of importance. Alternatively, it is also possible to achieve differentiation from an indication having a low degree of importance by blinking indication details having a high degree of importance.

In addition, an editing process for printing data, that is, the processes of Act72 to Act75 may be omitted. That is, the printing data may be printed on a label sheet using the same layout regardless of a degree of importance. In addition, a printing device is not limited to a label printer. For example, a receipt printer that prints data on a receipt sheet may also be used.

The voice input terminal 10 may include a display device instead of the voice output device 16 or in combination with the voice output device 16, so that the management server 20 may give notice of a missing word as display data.

In the embodiment, an indication management device of an indication management system by which a manager of a retail store can give an indication to a plurality of store clerks in charge of commodity delivery by using a voice input, that is, the management server 20 is exemplified. The indication management device is not limited thereto. The indication management device is applicable when an indicator gives an indication to an unspecified operator by using a voice input.

Further, in the embodiment, description is given on the assumption that a control program of the management server 20 is stored in the main memory 22 or the auxiliary storage device 23. The control program may not be stored in the main memory 22 or the auxiliary storage device 23. A control program transferred separately from the management server 20 may be written in a writable storage device included in the management server 20 in response to an operation of a user or the like. The transfer of the control program and the like can be performed by being recorded in a removable recording medium or by communication through a network. The form of the recording medium does not matter as long as it is a device, such as a CD-ROM or a memory card, which is capable of storing programs and which is readable by a device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An indication management device, comprising:
   a voice acquisition component for acquiring a voice input by a voice input terminal;
   an indication recognition component for recognizing details of an indication from the voice input acquired by the voice acquisition component;
   an importance degree determination component for determining a degree of importance of the indication from the voice acquired by the voice acquisition component;
   an output control component for controlling output of indication details to an output device in accordance with the degree of importance determined by the importance degree determination component; and
   a requesting component for confirming whether or not a word necessary for recognition of details of the indication is included in the voice input and request a user of the voice input terminal to input a voice again when the word is not included in the voice.

2. The device according to claim 1, wherein the importance degree determination component determines the degree of importance of the indication in accordance with whether or not a word representing a degree of importance is included in the voice.

3. The device according to claim 1, wherein the importance degree determination component calculates a required time by a time when a word representing the time is included in the voice and determines the degree of importance of the indication in accordance with a length of the required time.

4. The device according to claim 1, wherein the output control component outputs indication details having a high degree of importance to the output device in an emphasized manner as compared to indication details having a low degree of importance.

5. The device according to claim 1, wherein the output control component outputs indication details having a high degree of importance to the output device in an emphasized manner as compared to indication details having a medium degree of importance.

6. The device according to claim 1, wherein the output control component outputs indication details having a medium degree of importance to the output device in a more conspicuous manner as compared to indication details having a low degree importance.

7. The device according to claim 1, wherein the voice input terminal comprises a wireless communication device.

8. The device according to claim 1, wherein the output device is label printer.

9. The device according to claim 1, wherein the word representing the degree of importance is a time sensitive word.

10. A control method of causing a computer comprising a communication unit communicating with a voice input terminal and an output device to realize functions of:
    acquiring a voice input by the voice input terminal;
    recognizing details of an indication from the acquired voice input;
    determining a degree of importance of the indication from the acquired voice input;
    controlling output of indication details to the output device in accordance with the degree of importance; and
    confirming whether or not a word necessary for recognition of details of the indication is included in the voice input and request a user of the voice input terminal to input a voice again when the word is not included in the voice.

11. The method according to claim 10, further comprising:
    determining the degree of importance of the indication in accordance with whether or not a word representing a degree of importance is included in the voice.

12. The method according to claim 10, further comprising:
    calculating a required time by a time when a word representing the time is included in the voice; and determining the degree of importance of the indication in accordance with a length of the required time.

13. The method according to claim 10, further comprising:
outputting indication details having a high degree of importance to the output device in an emphasized manner as compared to indication details having a low degree of importance.

14. An indication management device, comprising:
a voice acquisition component for acquiring a voice input by a voice input terminal;
an indication recognition component for recognizing details of an indication from the voice input acquired by the voice acquisition component;
an importance degree determination component for determining a degree of importance of the indication from the voice input acquired by the voice acquisition component; and
an output control component for controlling output of indication details to an output device in accordance with the degree of importance determined by the importance degree determination component,
wherein the importance degree determination component calculates a required time by a time when a word representing the time is included in the voice input and determines the degree of importance of the indication in accordance with a length of the required time.

15. An indication management device, comprising:
a voice acquisition component for acquiring a voice input by a voice input terminal;
an indication recognition component for recognizing details of an indication from the voice acquired by the voice acquisition component;
an importance degree determination component for determining a degree of importance of the indication from the voice acquired by the voice acquisition component; and
an output control component for controlling output of indication details to an output device in accordance with the degree of importance determined by the importance degree determination component,
wherein the output control component outputs indication details having a high degree of importance to the output device in an emphasized manner as compared to indication details having a medium degree of importance.

16. An indication management device, comprising:
a voice acquisition component for acquiring a voice input by a voice input terminal;
an indication recognition component for recognizing details of an indication from the voice acquired by the voice acquisition component;
an importance degree determination component for determining a degree of importance of the indication from the voice acquired by the voice acquisition component; and
an output control component for controlling output of indication details to an output device in accordance with the degree of importance determined by the importance degree determination component, wherein
the output control component outputs indication details having a medium degree of importance to the output device in a more conspicuous manner as compared to indication details having a low degree importance.

17. A control method of causing a computer comprising a communication unit communicating with a voice input terminal and an output device to realize functions of:
acquiring a voice input by the voice input terminal;
recognizing details of an indication from the acquired voice input;
determining a degree of importance of the indication from the acquired voice input;
controlling output of indication details to the output device in accordance with the degree of importance;
calculating a required time by a time when a word representing the time is included in the voice input; and
determining the degree of importance of the indication in accordance with a length of the required time.

* * * * *